Sept. 18, 1956 O. W. GREENE 2,763,124
EXPANDABLE BEAD CHAIN
Filed Jan. 27, 1955

INVENTOR.
Oliver Watson Greene
BY
Barlow & Barlow
ATTORNEY

United States Patent Office 2,763,124
Patented Sept. 18, 1956

2,763,124

EXPANDABLE BEAD CHAIN

Oliver Watson Greene, Providence, R. I.

Application January 27, 1955, Serial No. 484,383

7 Claims. (Cl. 59—79)

This invention relates to a bead chain, particularly an ornamental bead chain adapted for use in necklaces, wrist bands, belts, and/or the like.

An object of the invention is to provide a bead chain wherein each bead will be connected to the other by means of an expandable connector constructed so as to maintain each bead properly spaced from the other.

A more specific object of the invention is to provide a bead connector element having a plurality of spaced coil spring parts.

Another object of the invention is to provide a bead chain wherein the beads are formed directly on the bead connector element.

With these and other objects in view, the invention consists of certain novel features of construction as well be more fully described and particularly pointed out in the appended claims.

The bead chain according to one embodiment of the present invention comprises an expandable connector element which is in the form of a plurality of spaced coil spring units made in a continuous length. This connector element is inserted in a length of suitable tubular material. Then by means of suitable machine operation the tubular material is deformed about the springs into separate bead elements which enclose the springs within the bead thus formed. The end walls of the bead are spaced from the spring and form shoulders or abutments which restrain or limit the expansion of the spring so as to prevent a pull exerted on the end portions of the connector to expand the same from stretching the springs beyond the elastic limit thereof. In turn, the springs provide for maintaining the beads in proper spaced relation along the connector element.

In a second embodiment of the invention the connector element is made of a plurality of linked coil spring units. Each of the springs is similarly encased in beads formed thereon as above described so as to result in a bead chain wherein the beads are linked to each other for greater flexibility and yet retain the expandability of the first above described embodiment of the invention.

Figure 4:
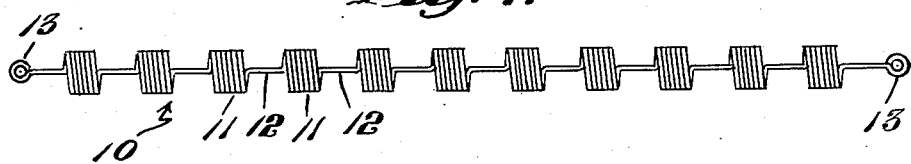
Figure 4 is an elevational view of the coil spring bead connector of Figure 1.

In proceeding with the first embodiment of the invention, I provide a connector designated generally 10 (see Figure 4) comprising a plurality of coil spring sections 11 made of one continuous length of wire. These sections 11 are equally spaced from each other by a straight length 12 of said wire. The spring sections may be coiled in the known manner on spring forming machines modified to the extent to provide a straight stretch of the wire between each spring section. Preferably, the sections are made from soft drawn wire and then subjected to known spring hardening processes to result in a connected series of properly tempered spring sections 11 extending in a straight line.

Figure 1:
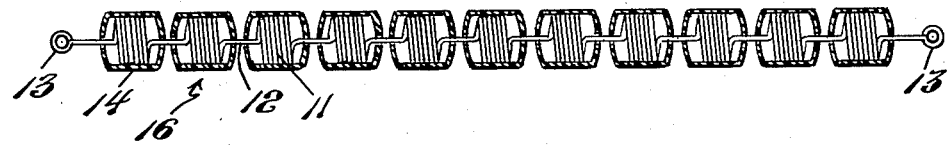
Figure 1 is a longitudinal sectional view through a bead chain embodying my invention.
Figure 2:
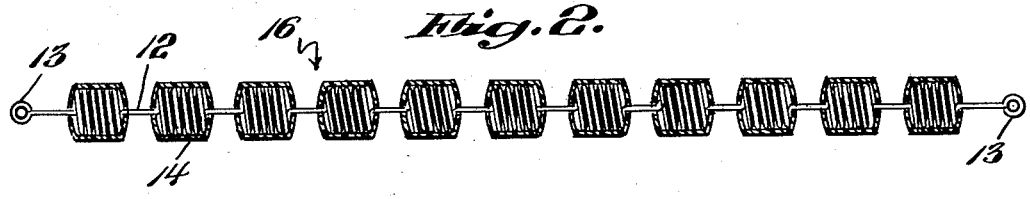
Figure 2 is a similar view showing the chain expanded.
Figure 3:
Figure 3 is a longitudinal section of a tubular element from which the beads of Figure 1 are formed.
Figure 5:
Figure 5 is a longitudinal section showing the bead connector of Figure 4 inserted in the tubular element of Figure 3, illustrating one step in the process of forming the beads to encompass the individual spring units of the connector.

The beads designated 14 (see Figures 1 and 2) may be formed in various manners, as for example, individual lengths of suitable tubular material may be positioned in place about each spring section 11 and thereafter subjected to appropriate machine tool operations (not shown) to complete the formation of the bead about the section 11. Preferably the beads are formed of tubular plastic material such as the synthetic resins, as for example the so-called vinyls. The tubular material may be any desired color. The spring connector 10, the ends of which may be formed with eyes 13, is inserted into a length 15 (see Figure 5) of the said plastic material with the ends of the connector extending the proper distance beyond the ends of the tube 15. The inner diameter of the tube 15 and the diameter of the spring sections are so related as to provide only the necessary frictional engagement to maintain proper relation between the two when subjected to the process of forming the beads on the connector. The forming of the beads 14 may be accomplished by any suitable plastic working operation or operations known to workers in the plastic art. As by way of example, the tube 15 with the connector 10 in proper position therein is passed or so-called indexed through a forming machine (not shown) to be passed in succession through a series of hot progressive dies which act on the tube 15 to deform the same at proper spaced intervals into a series of individual separate bead-like elements 14, the ends of which are closed about the straight portion 12 of the connector 10 resulting in a bead chain 16 as shown in Figures 1 and 2.

It will be quite apparent that the beads may take any of various shapes or forms within reason, such for example as circular or polygonal in cross section, and combinations of these shapes. It will also be apparent that there is some choice in the spacing between heads and also in the amount of expansion permitted in the chain 16 as a whole. In the illustration of the invention in Figures 1 and 2, the ends of the beads are shown as having been closed to form an orifice slightly larger than the diameter of the straight wire portion 12. The ends of the beads, however, if desired, may be closed only sufficiently to form shoulders to retain the spring unit 11 confined within the bead.

In this first described embodiment of the invention the straight or connector portion 12 of the connector 10 is hardened and tempered as are the spring units 11. This provides a certain degree of flexibility in the connector, that is, the length of wire 12 is sufficiently flexible so that the bead chain 16 may be shaped to form necklaces, wrist bands, and/or the like.

Figure 6:
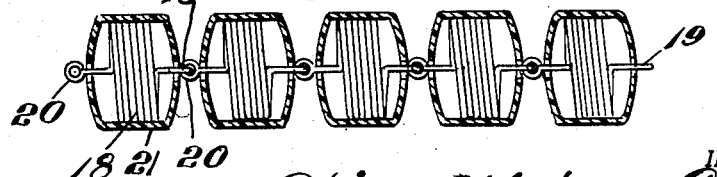
Figure 6 is a longitudinal section drawn on a larger scale, showing a modified bead spring connector.

It is desirable in some instances that the chain 16 have greater flexibility than that provided by the flexibility of the straight wire portion 12. To this end (see Figure 6) the connector 17 is preferably made in a continuous length of soft drawn wire into a plurality of spaced spring sections. The connecting lengths of the wire between units are then severed midway thereof, and the end portions of these severed wires are formed into eyes 19 and 20. Thus, each unit 18 becomes a separate link to be connected one to the other in the obvious manner to form a linked chain of spring units 18. The connector 17 may then be inserted into a properly dimensioned tubular member and indexed through a forming machine as above described so as to deform the tubular member into separate beads 21 to encase the spring portions of units 18 as above described and thus produce a bead chain wherein each bead is swivelly linked to the other.

I claim:

1. An expandable bead chain comprising a plurality of hollow beads, a plurality of coil springs having a straight wire portion at each end thereof, said springs being frictionally embraced by and enclosed in said beads, said beads having an inside longitudinal dimension greater than the length of a retracted coil spring, and means connecting said beads to each other in spaced relation through said straight wire portion.

2. An expandable bead chain as set forth in claim 1 wherein said beads are formed of tubular synthetic plastic material.

3. An expandable bead chain as set forth in claim 1 wherein the means connecting said beads comprises an integral continuous length of wire for said springs and connecting portions.

4. An expandable bead chain as set forth in claim 1 wherein the means to connect said beads comprises swivel links on each straight wire portion.

5. An expandable bead chain comprising a plurality of beads, each of said beads consisting of a hollow member having centrally perforated closed end portions, a coil spring frictionally embraced within each hollow member and spaced from said closed end portions when in retracted position, and means including a straight wire portion intermediate each pair of said hollow members extending through said perforated end portions connecting said springs to each other.

6. An expandable bead chain as set forth in claim 5 wherein said means connecting said springs is a straight flexible wire portion that is integral with said springs.

7. An expandable bead chain as set forth in claim 5 wherein said means connecting said springs is a swivel link at the end of each straight wire portion.

References Cited in the file of this patent

UNITED STATES PATENTS

| 2,302,426 | Domler | Nov. 17, 1942 |
| 2,667,739 | Flaig | Feb. 2, 1954 |

FOREIGN PATENTS

| 7,409 | Great Britain | May 4, 1905 |